United States Patent
Berman

[19]

[11] Patent Number: 5,947,412
[45] Date of Patent: Sep. 7, 1999

[54] JET ENGINE NOISE SUPPRESSOR ASSEMBLY

[75] Inventor: Charles H. Berman, East Windsor, N.J.

[73] Assignee: Titan Corporation, San Diego, Calif.

[21] Appl. No.: 08/782,487

[22] Filed: Jan. 10, 1997

[51] Int. Cl.⁶ .................................................. B64D 33/04
[52] U.S. Cl. .................. 244/1 N; 244/73 R; 239/265.17; 60/226.1
[58] Field of Search .................. 244/1 N, 73 R; 239/265.17, 127.1, 127.3; 60/226.1, 262, 271

[56] References Cited

U.S. PATENT DOCUMENTS

| | | | |
|---|---|---|---|
| 3,572,466 | 3/1971 | Horn et al. | 239/265.17 |
| 4,175,640 | 11/1979 | Birch et al. | 60/262 |
| 5,157,916 | 10/1992 | Wynosky et al. | 60/204 |
| 5,216,878 | 6/1993 | Klees | 60/204 |
| 5,222,359 | 6/1993 | Klees et al. | 60/204 |
| 5,269,139 | 12/1993 | Klees | 60/262 |
| 5,440,875 | 8/1995 | Torkelson et al. | 60/226.1 |
| 5,638,675 | 6/1997 | Zysman et al. | 60/262 |
| 5,722,233 | 3/1998 | Nikkanen et al. | 60/262 |

*Primary Examiner*—Charles T. Jordan
*Assistant Examiner*—Charles R. Ducker, Jr.
*Attorney, Agent, or Firm*—LEM

[57] ABSTRACT

The present invention relates to a noise supressor assembly for a jet engine comprised of a plurality of conduit assemblies proximate the trailing edges of the wall members which capture a portion of an ambient gaseous stream flowing in an ambient flow for introduction into the hot core gaseous flow to thereby deform the interface between the hot core flow and the fan flow or ambient flow when there is no fan between the fan flow and the ambient flow or between fully or partially mixed core and fan flows and the ambient flow thereby mixing such gaseous streams to thereby reduce velocity of the hot core and fan flows and thus jet noise level.

24 Claims, 2 Drawing Sheets

JET ENGINE NOISE SUPPRESSOR ASSEMBLY

BACKGROUND OF THE INVENTION

1. Field of the Invention

This invention relates generally to fluid mixing assemblies, and more particularly to an assembly for suppressing noise of a jet engine.

2. Description of the Prior Art

With the advent of the jet engine, there was and is the concomitant problem of noise. Jet noise is produced by the turbulent fluctuations in the jet formed from the hot core and bypass flows. It is responsible for the lower frequency components of engine noise which are difficult to reduce using standard acoustical techniques. Jet noise reduction has been achieved by mixing the jet exhaust flow with the ambient air at the expense of large thrust losses, reduced payload and range due to increased aircraft weight, and increased mechanical complexity.

Since jet noise is a sensitive function of the jet velocity, V, with the noise power varying as $V^8$ for subsonic flows and $V^3$ for supersonic flows, jet velocity reduction is a prime approach. The objective of most techniques is to reduce the jet velocity by increasing the mixing between the jet and ambient flows.

For currently flying commercial aircraft moderate reductions in noise level are desired, but would be implemented only if the cost to flight performance was very small. For the proposed supersonic aircraft the required noise reduction is large, but somewhat larger penalties are permissible. However, the state of the art in either subsonic or supersonic applications does not justify the use of current technology to reduce jet noise because of performance penalties and hardware complexity.

The use of small auxiliary jet flows to interact with the main jet flow to increase mixing could reduce the amount of hardware needed and thus reduce the flight performance penalties. It has been shown that the interaction of two small radial jets with a subsonic main jet did increase mixing, but noise measurements were not taken. Reductions in so-called "screech" noise for supersonic jets was formed when small jets intersected a main jet at a shallow angle.

Prior art attempts at jet noise reduction were also directed to the modification of the exhaust nozzle systems manifested through the deformation of exhaust nozzle cross-section into a series of lobes, chutes or individual tubes.

While somewhat effective, there remains the need for an assembly to further reduce jet engine noises, particularly during take-off of the aircraft.

OBJECTS OF THE INVENTION

An object of the present invention is to effect substantial jet noise reduction by an improved jet engine noise suppressor assembly.

Another object of the present invention is to provide a noise suppression system for a jet engine which does not greatly increase aircraft weight.

Yet another object of the present invention is to provide a noise suppressor system for a jet engine which does not effect the performance, cost and maintenance requirements.

Still another object of the present invention is to provide a noise suppression system for a jet engine which minimizes aerodynamic drag.

SUMMARY OF THE INVENTION

These and other objects of the present invention are achieved by a noise suppressor assembly for a jet engine comprised of a plurality of conduit assemblies proximate the trailing edges of the wall members which capture a portion of an ambient gaseous stream flowing in an ambient flow for introduction into the hot core gaseous flow to thereby deform the interface between the hot core flow and the fan flow or ambient flow when there is no fan between the fan flow and the ambient flow, or between fully or partially mixed core and fan flows and the ambient flow thereby mixing such gaseous streams and to thereby reduce the velocity of the hot core and fan flows and thus the jet noise level.

BRIEF DESCRIPTION OF THE DRAWINGS

A better understanding of the present invention, as well as other objects and advantages thereof will become apparent upon consideration of the detail disclosure thereof, especially when taken with the accompanying drawings wherein like numerals indicate like parts throughout and wherein.

DETAILED INITIAL DESCRIPTION OF THE INVENTION

Figure 1:
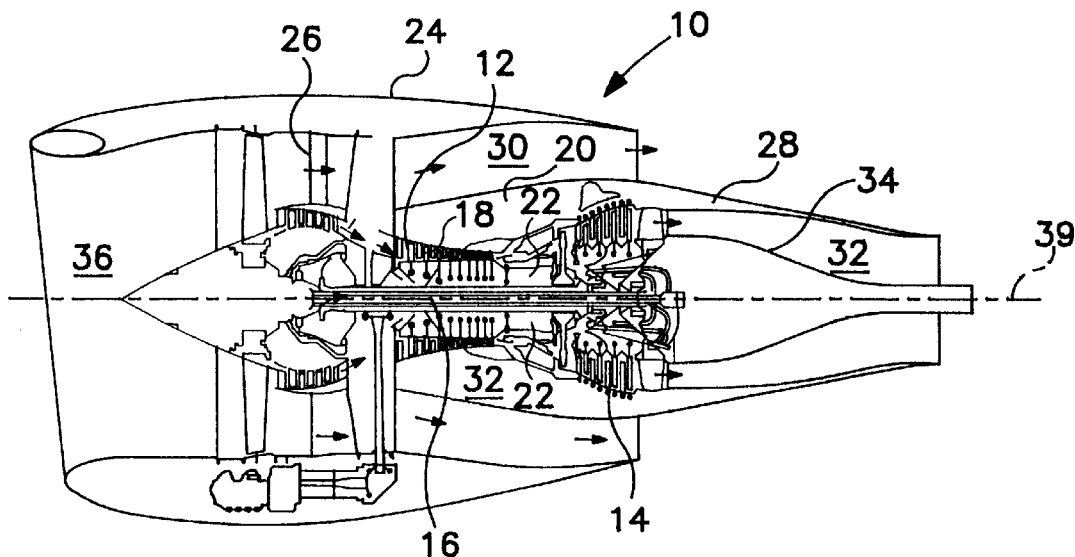
FIG. 1 is a schematic cross-sectional view of a typical by-pass jet engine.

Referring now to the drawings, and particularly FIG. 1, there is illustrated a by-pass jet engine, generally indicated as 10, comprised of a compressor assembly 12 and a turbine assembly 14 mounted for rotation on a shaft 16 positioned within a generally cylindrically-shaped engine wall 18 thereby forming a propulsion assembly, generally indicated as 20. The propulsion assembly 20 includes a plurality of radially-disposed combustion chambers 22 positioned between the compressor assembly 12 and the turbine assembly 14 within the engine wall 18.

The propulsion assembly 20 is mounted within a cylindrically-shaped outer wall member 24, such as by plurality of radially-disposed strut members 26. Mounted between the outer wall member 24 and propulsion assembly 20, there is disposed a cylindrically-shaped splitter wall member 28 defining an annular fan duct 30 for passing a fluid between the outer wall member 24 and the splitter wall member 28, and an annular duct 32 for passing a fluid between the propulsion assembly 20 and the engine center body plug 34 mounted downstream of the turbine assembly 14 of the propulsion assembly 20.

In operation, air is ingested into the jet engine 10 through an inlet 36 and is compressed in the compressor assembly 12. Compressed air is introduced into the combustion chambers 22 and mixed with fuel and burned to produce hot combustion gases which thereafter pass through the turbine assembly 14 providing a source of power to drive the compressor assembly 12. The hot combustion gases exit the turbine assembly 14 of the propulsion assembly 20 as a hot gaseous core flow through the annular duct 32 thereby providing thrust. If the center body plug 34 ends upstream of the trailing edge of the splitter wall member 28, then the annular duct 32 will be a cylindrical duct at the trailing edge of splitter wall member 28. A portion of the air drawn into the inlet 36 is passed about the propulsion assembly 20 between the splitter wall member 28 and the outer wall member 24 and constitutes the by-pass fan gas flow duct 30.

Figure 2:
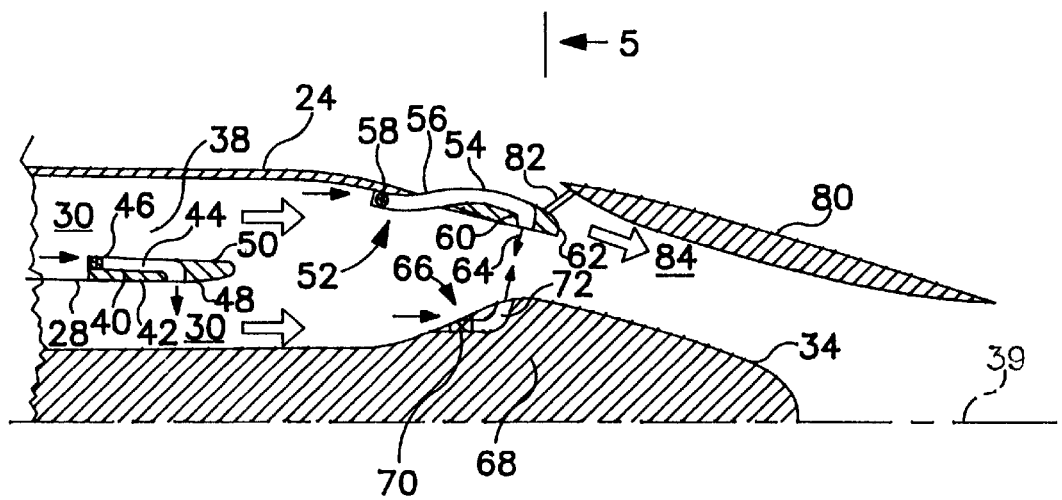
FIG. 2 is a schematic partial cross-sectional view of one embodiment of the present invention.

In a preferred embodiment of the present invention, referring now to FIG. 2, at a trailing edge of the splitter wall member 28, there are mounted a plurality of radially-disposed conduit assemblies, generally indicated as 38, mounted such as by welding 40, on a support to position the entrance of conduit 42 away from slow moving boundary layer air on outside wall of splitter wall member 28. Each conduit assembly 38 is comprised of an L-shaped conduit 42 including a main body portion 44 having a valve 46 and a perpendicularly-disposed leg portion 48. A faired mounting member 50 is positioned downstream of the conduit assembly 38 to reduce aerodynamic drag. The axis of the main body portion 44 of the L-shaped conduit 42 of each conduit assembly 38 is parallelly-disposed to the major axis of the propulsion assembly 20 extending into the gas flow of the by-pass fan duct 30. The perpendicularly-disposed leg portion 48 extends generally towards the axis of the propulsion assembly 20 and the gaseous flow of the hot core duct 32. The cross-sectional area of the L-shaped conduits 42 are of from about 1 to 10 percent of the cross-sectional area of the hot core duct 32 at the point at which the leg portions 48 of each L-shaped conduits 42 are mounted on the splitter wall member 28.

A plurality of conduit assemblies, generally indicated as 52, are radially-disposed about a trailing edge of the outer wall member 24. Each conduit assembly 52 is comprised of a generally L-shaped conduit member 54 including curvelinearly-shaped main body portion 56 including a valve 58 and a perpendicularly-disposed leg portion 60. A faired mounting member 62 is positioned downstream of each L-shaped conduit member 54 to reduce aerodynamic drag.

The axis of the main body portion 56 of a conduit member 54 of each conduit assembly 52 is parallelly-disposed to the velocity vector of the flow near the entrance of conduit member 54 in the by-pass fan duct 30. The perpendicularly-disposed leg portion 60 extends towards the axis of the propulsion assembly 20 and into a combined gaseous flow at 64 comprised of the flows in ducts 30.

A plurality of conduit assembly, generally indicated as 66, are radially-disposed and mounted within the center body plug 34 of the propulsion assembly 20. Each conduit assembly 66 includes a front leg portion 68 having a valve member 70 and a substantially perpendicularly-disposed rear leg portion 72. An axis of the front leg portion 68 is parallelly-disposed to the velocity vector of the flow of the hot core duct 32 proximate the entrance of front leg portion 68. The rear leg portion 72 extends substantially perpendicularly to the axis of the propulsion assembly 20 and outwardly in a radial direction towards the leg portions 60 of the conduit assemblies 52 radially mounted about the outer wall member 24 and into the combined gaseous flow 64. The conduit assemblies 52 and 66 are dimensioned of from about 1 to 10 percent of the cross-sectional area of the combined gaseous flow at 64.

A conically-shaped ejector shroud 80 is spaced apart from the center body plug member 34 and the trailing edge of the outer wall member 24 and is radially mounted to the outer wall member 24 to provide a cylindrically-shaped channel 84 for ambient air flow therethrough to be combined with the combined total gaseous flow exiting at 64 and thence through a conduit assembly 39 defined by the shroud 80. The ejector 80 may contain sound absorbing material or constructed to reduce noise generated by the flow interactions. Local modifications to the ejector 80 can increase the effectiveness of conduits 42.

Figure 3:
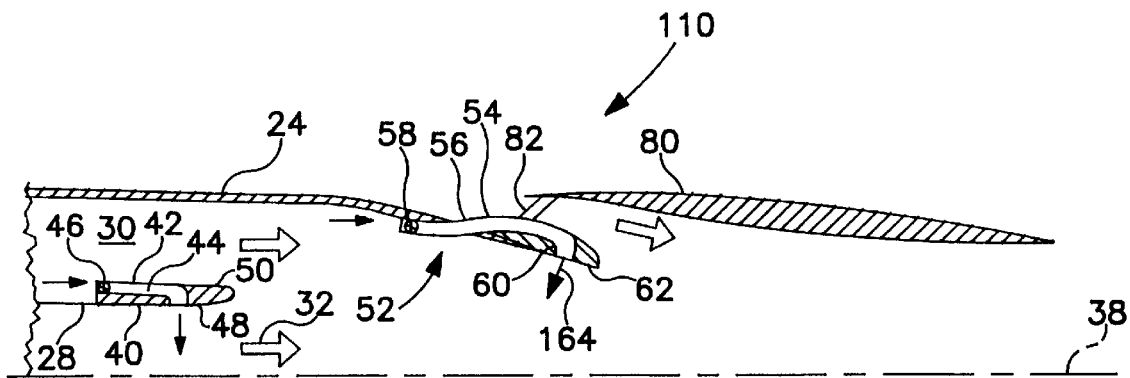
FIG. 3 is a schematic partial cross-sectional view of another embodiment of the present invention.

Referring now to FIG. 3, there is illustrated another embodiment of the present invention, generally indicated as 110 and does not include any engine center body plug member. The trailing edge of the splitter wall member 28 and the trailing edge of the outer wall member 24 are provided with a plurality of radially-disposed conduit assemblies, generally indicated as 38 and 52, as herein described with reference to FIG. 2. In this embodiment of the present invention, the cross-sectional area of the L-shaped conduits 42 of the conduit assemblies 38 are from about 1 to 10 percent of the cross-sectional area of the hot core duct 32 at the point in which the leg portions 48 of each L-shaped conduit 42 are mounted on the splitter wall member 28. The conduit assemblies 52 mounted on the outer wall member 24 are from about 1 to 10 percent of the cross-sectional area of the combined gas flow at 164, the jet engine assembly 110 is similarly provided with a conically-shaped ejector shroud 80.

Figure 4:
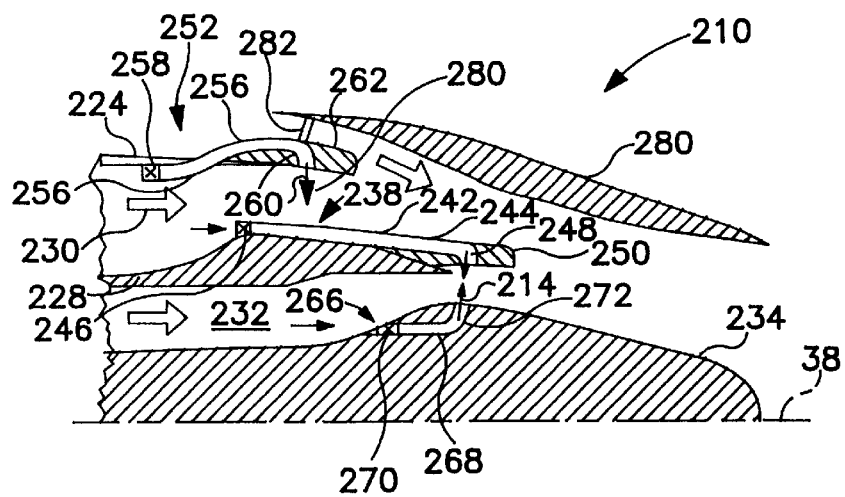
FIG. 4 is a schematic partial cross-sectional view of still another embodiment of the present invention.
Figure 5:
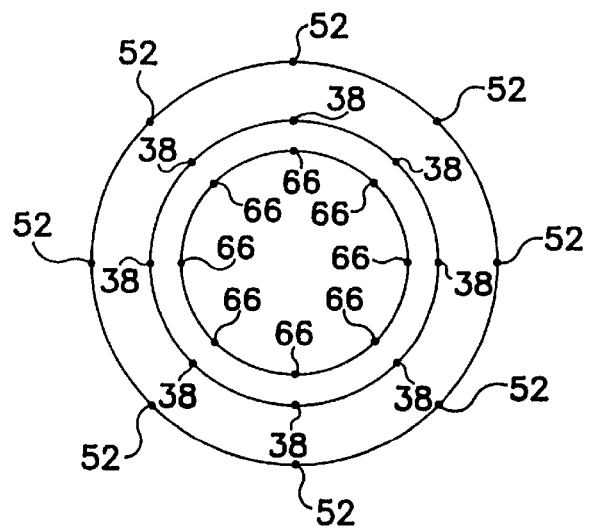
FIG. 5 is a schematic end view of conduit assembly positionings about the outlet end of the jet engine of the embodiment of FIG. 2.

In the embodiment of present invention illustrated in FIG. 4, there is illustrated a jet engine assembly, generally indicated as 210, having an outer wall member 224 and a splitter wall member 228 wherein the splitter wall member 228 has a trailing edge extending beyond the trailing edge of the outer wall member 224. To the trailing edge there are mounted a plurality of radially-disposed conduit assemblies, generally indicated as 238, mounted such as by welding 240. Each conduit assembly 238 is comprised of an L-shaped conduit 242 including a main body portion 244 having a valve 246 and a substantially perpendicularly-disposed leg portion 248. A faired mounting member 250 is positioned downstream of the conduit assembly 238 to reduce aerodynamic drag.

The axis of the main body portion 244 of the L-shaped conduit 242 of each conduit assembly 238 is substantially parallelly-disposed to the major axis of the jet engine 210 extending into the gas flow of the by-pass fan duct 230. The substantially perpendicularly-disposed leg portion 248 extends generally towards the axis of the jet engine 210 and the gaseous flow of the hot core duct 232. The cross-sectional area of the L-shaped conduit 242 are of from about 1 to 10 percent of the cross-sectional area of the hot core duct 232 at the point at which the leg portions 246 of each L-shaped conduit 242 are mounted on the splitter wall member 228.

A plurality of conduit assemblies, generally indicated as 266, are radially-disposed and mounted within the center body plug 234 of the jet engine 210. Each conduit assembly 266 is comprised of a generally L-shaped conduit member 268 having a valve member 270 and a substantially perpendicularly-disposed rear leg portion 272. An axis of the L-shaped portion 268 is substantially parallelly-disposed to the axis of the jet engine 210 and into the flow of the hot core duct 232. The rear leg portion 272 extends substantially perpendicularly to the axis of the jet engine 210 and outwardly in a substantially radial direction towards the leg portion 248 of the conduit assemblies 238 and into the hot core duct 232. The conduit assembly 252 are dimension to about 1 to 10 percent of the cross-sectional area of the hot core duct at 264.

A plurality of conduit assembly, generally indicated as 252, are radially-disposed about a trailing edge of the outer wall member 224. Each conduit assembly 252 is comprised of a generally L-shaped conduit member 254 including a valve 258 and a substantially perpendicularly-disposed leg portion 260. A faired mounting member 262 is positioned downstream of each L-shaped conduit member 254 to reduce aerodynamic drag. The axis of the main body portion 256 of a conduit member 254 of each conduit assembly 250 is parallelly-disposed to the velocity vector of the flow of the by-pass fan ducts 230 near the entrance of conduit 254. The substantially perpendicularly-disposed leg portions 260 extend towards the axis of the jet engine assembly 210 into the by-pass duct 230 at such point. The conduit assembly 252 are of from about 1 to 10 percent of the cross-sectional area of the flow at 280.

In operation, during take off procedure, referring to the embodiment of FIG. 2, the valve assemblies 46, 58 and 70 of the conduit assemblies 38, 52 and 66, respectively, are in an open configuration to permit gaseous flow during taxiing and take-off of the aircraft. Flow of the by-pass flow duct and hot core duct are caused to flow through the conduit members 42, 54 and 68 and thus in transverse flow into the hot core duct flow, the by-pass core fan duct or combined gaseous flow to effect fully or partial mixed core and fan flow with ambient flow thereby mixing such gaseous stream to reduce the velocity of the hot core and fan duct flows and thereby reduce jet noise level. On reaching effective altitude and distance from the airport at a given velocity, the valve members 46, 58 and 68 of the conduit assemblies 38, 52 and 66, respectively, are closed to thereby prevent further gaseous flow through such conduit assemblies.

There is no restriction placed on the number of conduit assemblies 38, the shape of their cross-sections, their cross-sectional areas, the symmetry or asymmetry of placement azimuthally around the jet engine axis, the constancy of the cross-sectional areas or shapes for a given assembly 38 or between different assemblies. The entrances or exits of the conduit assemblies do not need to lie in the same plane.

Similarly, the auxiliary jets produced by the conduit assemblies may be directed towards the engine centerline or canted to miss it so that a swirling flow pattern is created.

In some instances it may be advantageous that the number of inlets and outlets of a conduit assembly not be equal so that one inlet may supply more than one outlet or vice versa. Also rather than having a single flow path in a conduit assembly, a central plenum chamber may be used to receive all of the gas obtained from a number of parallelly-disposed collector conduits which would be connected to a number of perpendicularly-disposed outlet conduits. In one limit the collector conduit could be a single annular slot.

When not in use, the conduit geometry may be reconfigured to reduce aerodynamic drag during aircraft cruise. This can be accomplished by a variety of means ranging from repositioning the conduit assemblies to changing their shapes, lengths. Some of these reconfigurations may be more readily facilitated if the conduits are not fully leakproof, as long as the leakage is not excessive.

The conduit assemblies may be utilized in conjunction with other flow devices which displace and mix flows. For example, flow invertors applied to by-pass engines switch the hot core gas flow to outer radial locations and the cooler by-pass flow to the inner radial positions. Conduit assemblies can be used to mix ambient flow with the hot core gases at the outer flow locations and the core and by-pass flows directly together. Other mechanical mixers can produce a uniform flow from separate core and by-pass flows with conduit assemblies used to mix the ambient flow with the mixed flows. The conduit assemblies can be utilized on non-circular jet and by-pass ducts, e.g., ducts with elliptical and rectangular cross-sections.

While the invention has been described in connection with the exemplary embodiments thereof, it will be understood that many modifications will be apparent to those of ordinary skill in the art and that this application is intended to cover any adaptations or variations thereof. Therefore, it is manifestly intended that this invention be only limited by the claims and the equivalence thereof.

What is claimed:

1. A noise suppressor assembly for a jet engine having an outer wall and a splitter wall wherein said outer wall and said splitter wall define a by-pass flow duct and said splitter wall defines a hot core duct, which comprises:

a plurality of first conduit assembly means radially mounted about said outer wall for passing a portion of gas passing through said by-pass flow duct transversely into said by-pass flow duct;

a plurality of second conduit assembly means radially-disposed about said splitter wall for passing a portion of gas passing through said by-pass flow duct transversely into said hot core duct.

2. The noise suppressor assembly as defined in claim 1 wherein said jet engine includes a center body plug member and further comprising a plurality of third conduit assembly means radially mounted about said center body plug member for passing a portion of gas passing through said jet engine traversely to gases laterally passing through said jet engine.

3. The noise suppressor as defined in claim 1 wherein said first conduit assembly means is formed of an L-shaped conduit member having an elongated portion and a perpendicularly-disposed leg portion, said elongate tube portion including a valve member positioned with an axis of said elongated conduit being parallelly-disposed to an axis of said jet engine, said perpendicularly-disposed leg portion having an axis perpendicularly-disposed to said axis of said jet engine.

4. The noise suppressor assembly as defined in claim 1 wherein said second conduit assembly means is formed of an curvilinearly-shaped conduit member having an elongated tube portion and a perpendicularly-disposed leg portion, said elongated tube portion including a valve member and positioned with an axis being parallelly disposed to an axis of said jet engine, said perpendicularly-disposed leg portion having an axis perpendicularly-disposed to said axis of said jet engine and direction toward such axis.

5. The noise suppressor assembly as defined in claim 2 wherein said third conduit assembly means includes a conduit member having a valve and a perpendicularly disposed leg position with an axis of said conduit member being substantially parallelly-disposed to an axis of said jet engine and said perpendicularly-disposed leg portion being disposed radially outwardly perpendicularly-disposed to an axis of said jet engine.

6. The noise suppressor assembly as defined in claim 1 wherein cross-sectional area of said plurality of first conduit assembly means are from 1 to 10 percent of the cross-sectional area of gas flow at a point of transverse introduction into said by-pass flow duct.

7. The noise suppressor assembly as defined in claim 1 wherein said cross sectional area of said plurality of second conduit assembly means are from 1 to 10 percent of the cross sectional area of gas flow at the point of transverse introduction into said hot core duct.

8. The noise suppressor assembly as defined in claim 2 wherein cross sectional area of said plurality of third conduit assembly means are from 1 to 10 percent of cross sectional area of gas flow at the point of transverse introduction of gases laterally passing through said jet engine.

9. The noise suppressor assembly as defined in claim 1 wherein said plurality of first conduit assembly are disposed about a trailing edge of said outer wall.

10. The noise suppressor assembly as defined in claim 2 wherein said plurality of first conduit assembly are disposed about a trailing edge of said outer wall.

11. The noise suppressor assembly as defined in claim 3 wherein said plurality of first conduit assembly are disposed about a trailing edge of said outer wall.

12. The noise suppressor assembly as defined in claim 4 wherein said plurality of first conduit assembly are disposed about a trailing edge of said outer wall.

13. The noise suppressor assembly as defined in claim 5 wherein said plurality of first conduit assembly are disposed about a trailing edge of said outer wall.

14. The noise suppressor assembly as defined in claim 1 and further including a conically-shaped ejection shroud spaced apart from said trailing edge of said outer wall member.

15. The noise suppressor assembly as defined in claim 2 and further including a conically-shaped ejection shroud spaced apart from said trailing edge of said outer wall member.

16. The noise suppressor assembly as defined in claim 3 and further including a conically-shaped ejection shroud spaced apart from said trailing edge of said outer wall member.

17. The noise suppressor assembly as defined in claim 4 and further including a conically-shaped ejection shroud spaced apart from said trailing edge of said outer wall member.

18. The noise suppressor assembly as defined in claim 5 and further including a conically-shaped ejection shroud spaced apart from said trailing edge of said outer wall member.

19. The noise suppressor assembly as defined in claim 5 wherein leg portions of said second conduit assembly means extend towards leg portions of said fluid conduit assembly means.

20. The noise suppressor assembly as defined in claim 1 wherein a faired mounting member is positioned on said outer wall member downstream of each of said of said plurality of first conduit means.

21. The noise suppressor assembly as defined in claim 2 wherein a faired mounting member is positioned on said outer wall member downstream of each of said plurality of first conduit means.

22. The noise suppressor assembly as defined in claim 3 wherein a faired mounting member is positioned on said outer wall member downstream of each of said plurality of first conduit means.

23. The noise suppressor assembly as defined in claim 4 wherein a faired mounting member is positioned on said outer wall member downstream of each of said plurality of first conduit means.

24. The noise suppressor assembly as defined in claim 5 wherein a faired mounting member is positioned on said outer wall member downstream of each of said plurality of first conduit means.

* * * * *